UNITED STATES PATENT OFFICE.

BERNHARD HEYMANN, OF WIESDORF NIEDERRHEIN, RICHARD KOTHE, OF VOHWINKEL, NEAR ELBERFELD, OSKAR DRESSEL, OF MÜLHEIM-ON-THE-RHINE, AND ANTON OSSENBECK, OF COLOGNE, GERMANY, ASSIGNORS TO SYNTHETIC PATENTS CO., INC., OF NEW YORK, N. Y., A CORPORATION OF NEW YORK.

DERIVATIVES OF SUBSTITUTED AMINONAPHTHALENE SUBSTANCES.

1,218,655.   Specification of Letters Patent.   Patented Mar. 13, 1917.

No Drawing.   Application filed June 19, 1914.   Serial No. 846,195.

*To all whom it may concern:*

Be it known that we, BERNHARD HEYMANN, RICHARD KOTHE, OSKAR DRESSEL, and ANTON OSSENBECK, doctors of philosophy, chemists, citizens of the German Empire, residing at, respectively, Wiesdorf Niederrhein; Vohwinkel, near Elberfeld; Mülheim-on-the-Rhine, and Cologne-on-the-Rhine, Germany, have invented new and useful Improvements in Derivatives of Substituted Aminonaphthalene Substances, of which the following is a specification.

The present invention relates to the production of derivatives of aminonaphthalene substances substituted in the amino group by means of nitro derivatives of the halids of aromatic acids, of aromatic sulfo acids, etc., reduction to the corresponding amino products and finally condensation of these substances to ureids. The term "ureids" is here used to include the thioureids as well as the ureid itself.

These substitution derivatives of aminonaphthalene substances may be again substituted by the above acid halids before they are reduced and condensed to furnish the ureids.

The ureids of these substituted aminonaphthalene substances are characterized by containing in their molecule the general group:

A—NH—R—Y—NH— in which A stands for the radical of a naphthalene compound which may contain substituting groups, such as hydroxyl OH—, halogen Cl, Br, I, the sulfo group, etc., R stands for the residue of an acid group, such as —CO—, the residue of the carboxyl group; —SO$_2$—, the residue of the sulfonic group, etc.; and Y for an aromatic radical, such as phenylene —C$_6$H$_4$, naphthylene —C$_{10}$H$_6$, and their derivatives.

As starting material the aminonaphthalene substances may be employed in the form of their mono-, di-, or higher sulfonated derivatives in the form of other derivatives or in the form of the aminonaphthol derivatives. These aminonaphthalene substances are substituted by such nitro derivatives of halids of aromatic acids as para-nitro-benzoyl-chlorid, meta-nitro-benzoyl-chlorid of the formula:

meta-nitro-anisoyl-chlorid, etc., or by nitrobenzol-sulfonyl-chlorid of the formula:

or by 1-nitronaphthalene-5-sulfonylchlorid of the formula:

or by 1.5-nitro-naphthoylchlorid of the formula:

or by para-nitro-phenyl-urea-chlorid of the formula:

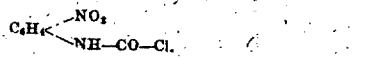

The reduction of these substituted aminonaphthalene substances is carried out by means of iron and acetic acid or by any other appropriate method furnishing products of the following general formula:

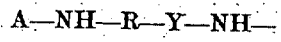

Finally these amino derivatives of the substituted aminonaphthalene substances are treated with phosgen, etc., to furnish the ureids with the following general formula:

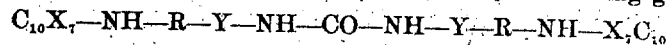

or when treated with bisulfid of carbon to furnish thiqureids with the following general formula:

If, as above stated, the acid halids are repeatedly introduced into the aminonaphthalene substances, derivatives of the following general formula are obtained:

$$C_{10}X_7—NH—R—Y—NH—R—Y—NH_2$$

which upon treatment with phosgen furnish ureids of the following general formula:

$$C_{10}X_7—NH—R—Y—NH—R—Y—NH—CO—NH—Y—R—NH—Y—R—NH—X_7C_{10}$$

and with bisulfid of carbon, thioureids of the following formula:

$$C_{10}X_7—NH—R—Y—NH—R—Y—NH—CS—NH—Y—R—NH—Y—R—NH—X_7C_{10}$$

In the same manner three, four, or still more molecules of the acid halids might be introduced into the aminonaphthalene substances and correspondingly more complicated substitution derivatives and finally ureids and thioureids are obtained.

In all these general formulæ R stands for a residue of an acid group.

For the formation of the substituted aminonaphthalene substances nitro derivatives of various acid halids may be employed, so that in the general formula last given one R may stand for —CO— and the other for —SO$_2$—, if nitro-benzoyl-chlorid and nitrobenzol-sulfo-chlorid were used for introduction into the aminonaphthalene substance.

The new products possess therapeutic value, as they show strong blood-parasite-destroying qualities and comparatively small injurious effect toward the host.

Many of them are also useful in the synthesis of azo dyestuffs as they combine with diazotized amins.

In carrying out our process practically we may proceed as follows, the parts being by weight:—

Example 1: 56.5 parts of the acid sodium salt obtained by the action of para-nitrobenzoyl chlorid upon 1-aminonaphthalene-3.6-disulfonic acid, subsequent reduction and introduction of the meta-nitro-benzoyl residue into the resulting acid and subsequent reduction

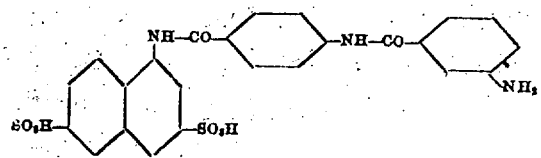

are dissolved in about 1000 parts of water and carbonate of soda to form the neutral salt. Then 50 parts of calcined carbonate of sodium are added, and phosgen is introduced into this solution at 40–50° C. in a slow current until an acidulated test portion does not react any more with sodium nitrate. The new acid is salted out. By dissolving in carbonate of soda and salting it out again, it is obtained as a white precipitate.

Example 2: 62.5 parts of the acid sodium salt obtained by the action of nitroanisoyl-chlorid on the reduced substituted derivative obtained from nitroanisoylchlorid and 1-aminonaphthalene-4.6-disulfonic acid and subsequent reduction which possesses the following formula:

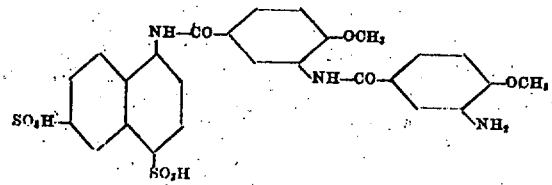

are dissolved in water and carbonate of soda to form the neutral salt. Then 50 parts of calcined sodium carbonate are added and phosgen is introduced as in Example 1.

The reaction is finished, if on addition of nitrite of sodium to an acidulated test portion no diazotation takes place any more.

The new acid thus obtained has the following formula:

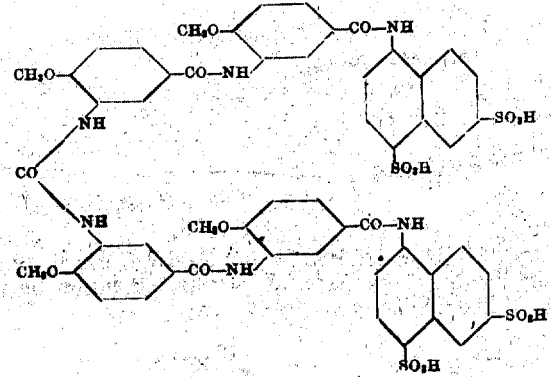

By dissolving the acid in carbonate of soda and salting it out again, it is obtained as a white precipitate. Even very dilute solutions of the acid make trypanosomes disappear from the blood of animals infected with them.

In a like manner ureas or thioureas with similar properties are obtained if other sulfonic acids such as 2.5.7- or 2.3.6-naphthylamindisulfonic acid or 1.4.6.8-naphthylamintrisulfonic acid are employed.

Example 3: 46 parts of the acid sodium salt of the substitution derivative obtained from the reaction of para-nitrobenzoylchlorid on 1.8-aminonaphthol-4.6-disulfonic acid and subsequent reduction which has the following constitution:

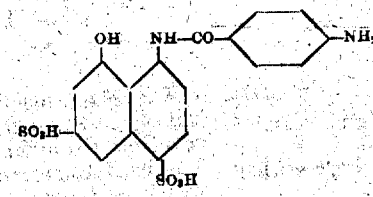

are dissolved in 1000 parts of water and treated with carbonate of soda, until the neutral salt is formed. Then 50 parts of crystallized sodium acetate are added, and while stirring phosgen is introduced in a slow current at a temperature of 40–45° C. The treatment with phosgen is continued until an acidulated test sample shows no reaction with nitrite which means that there is no amino substance present any more. Already during the operation the ureid separates for the greatest part. After the end of the reaction chlorid of sodium is added in order to complete the separation. The free acid has the following constitution:

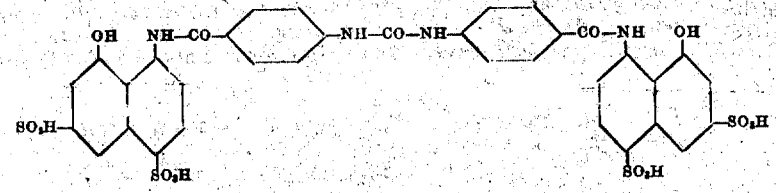

By dissolving the acid by means of carbonate of soda and subsequent addition of chlorid of sodium, the neutral salt of the above acid is precipitated as yellowish powder. Dilute solutions of this substance possess strongly trypanosomes-destroying action. The acid, when coupled with diazotized anilin, furnishes a clear, blue-red dyestuff.

Example 4: 60 parts of the neutral sodium salt obtained by the double introduction of the metanitrobenzoyl residue into 1.8-amino-naphthol-3.6-disulfonic acid and subsequent reduction which possesses the following formula:

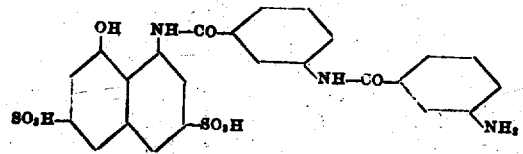

are dissolved in about 700 parts of water, 700 parts of alcohol are added and after the addition of 1 part of sulfur and 35 parts of $CS_2$ the mixture is boiled in a vessel provided with a reflux condenser. The alcohol is distilled off and the acid is precipitated. It has the following formula:

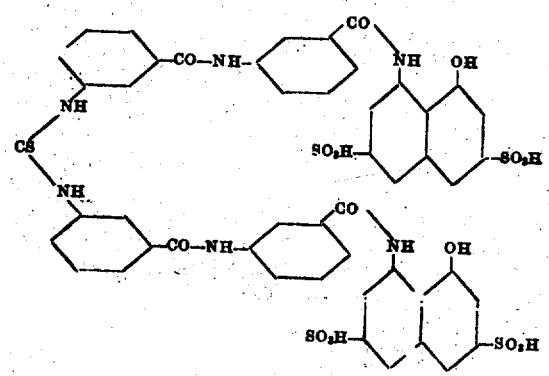

The neutral sodium salt of this acid after being filtered and dried is a powder which is soluble in water with a yellowish color.

The acid also forms azo dyestuffs, when coupled with diazotized anilin.

Example 5: 50 parts of the acid sodium salt obtained by the action of meta-nitrobenzolsulfonylchlorid on 1.8-aminonapththol-3.6-disulfonic acid and subsequent reduction which possesses the following formula:

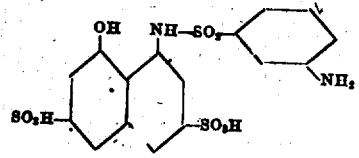

are dissolved with water and the required quantity of carbonate of soda to furnish the neutral salt. Then 50 parts of crystallized sodium acetate are added and phosgen is introduced as described in Example 1. The thus formed acid has the following formula:

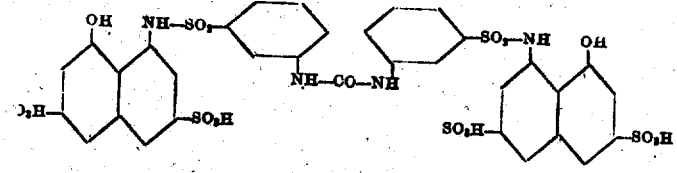

By dissolving the same with the addition of carbonate of soda and precipitating it by chlorid of sodium the neutral salt is obtained which is easily soluble in water. In the dry form the neutral salt is a faintly reddish powder. It forms azo dyes with diazobenzene.

Example 6: 64.5 parts of the acid sodium salt obtained by the action of nitroanisoyl chlorid on the reduced substituted derivative obtained from nitroanisoylchlorid and subsequent reduction which possesses the 1.8-aminonaphthol-4.6-disulfonic acid and following formula:

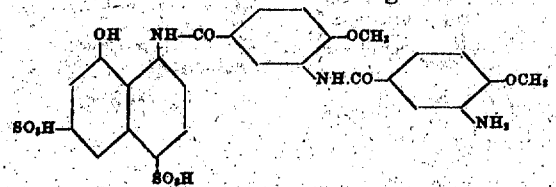

5 are dissolved in water and carbonate of soda to form the neutral salt. Then 50 parts of crystallized sodium acetate are added and phosgen is introduced as in Example 1. The new acid thus obtained has the following formula:

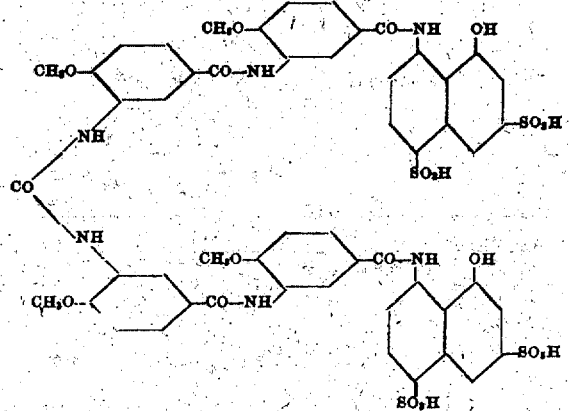

The neutral sodium salt in the dry form is a reddish powder easily soluble in water.

Example 7: 50 parts of the acid salt of the substitution derivative obtained from the reaction of meta-nitro-cinnamyl-chlorid on 1.8-aminonaphthol.4.6-disulfonic acid and subsequent reduction which has the following constitution:

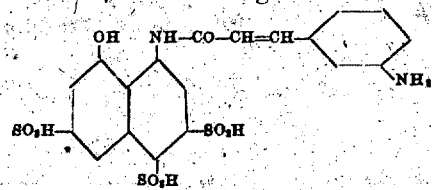

20 are dissolved in 1000 parts of water and treated with carbonate of soda, until the neutral salt is formed. Then 50 parts of crystallized sodium acetate are added and while stirring phosgen is introduced in a slow current at a temperature of 40-45° C. 25 The treatment with phosgen is continued until an acidulated test sample shows no reaction with nitrite which means that there is no amino substance present any more. Already during the operation the ureid separates for the greatest part. After the end of the reaction chlorid of sodium is added in order to complete the separation. The free acid has the following constitution:

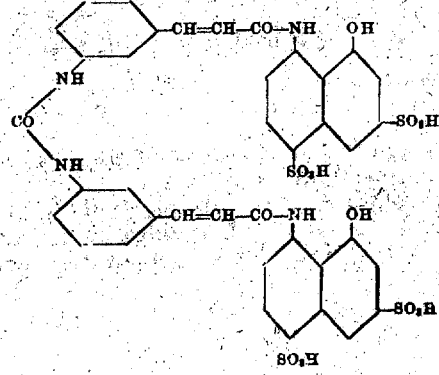

By dissolving the acid by means of carbonate of soda and subsequent addition of chlorid of sodium, the neutral salt of the above acid is precipitated as yellowish powder. Dilute solutions of this substance possess strongly spirochæta-destroying action. The acid when coupled with diazotized anilin, furnishes a clear red dyestuff.

Example 8: 63 parts of the acid sodium salt of the substitution derivative obtained by condensation of para-nitrocinnamyl-chlorid with the product of the reaction of para-nitro-cinnamylchlorid on 1.8-amino-naphthol-4.6-disulfonic acid and subsequent reduction which has the following constitution:

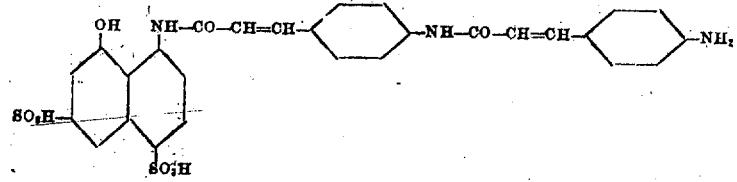

are dissolved in 1000 parts of water and treated with carbonate of soda, until the neutral salt is formed. Then 50 parts of crystallized sodium carbonate are added and while stirring phosgen is introduced in a slow current at a temperature of 40-45° C. The treatment with phosgen is continued until an acidulated test sample shows no reaction with nitrite which means that there is no amino substance present any more. Already during the operation the ureid separates for the greatest part. After the end of the reaction chlorid of sodium is added in order to complete the separation. The free acid has the following constitution:

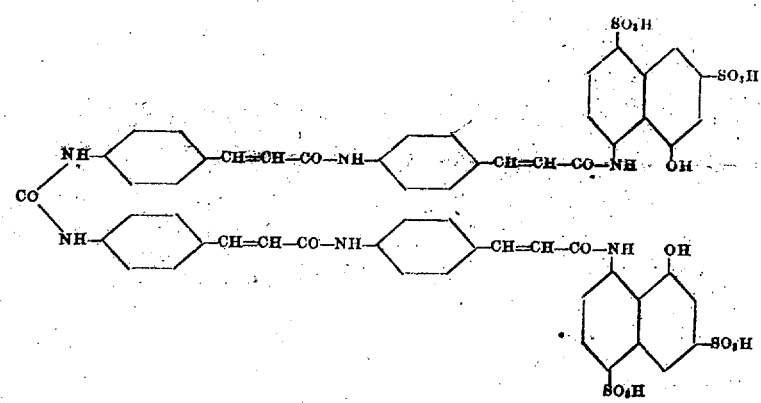

By dissolving the acid by means of carbonate of soda and subsequent addition of chlorid of sodium, the neutral salt of the above acid is precipitated as yellowish powder. The acid, when coupled with diazotized anilin furnishes a clear red dyestuff.

In a like manner ureas or thioureas with similar properties are obtained if other sulfonic acids such as 1.5.7-, 2.5.7-, 2.8.6- aminonaphthol sulfonic acid, 2.5.1.7-, 1.5.2.7- or 2.8.3.6-aminonaphthol disulfonic acid are employed.

Example 9: 48 parts of the acid sodium salt obtained by the double introduction of the metanitrobenzoyl residue into 1-amino-8-chloro-naphthalene-3.6-disulfonic acid and subsequent reduction which possesses the following formula:

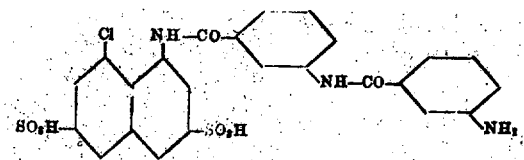

are dissolved in about 1000 parts of water and carbonate of soda to form the neutral salt. Then 50 parts of calcined sodium carbonate are added, and phosgen is introduced into this solution at 40-50° C. in a slow current until no diazotation takes place any more on addition of nitrite of sodium to an acidulated test portion. The new acid is salted out, it has in a free state the following formula:

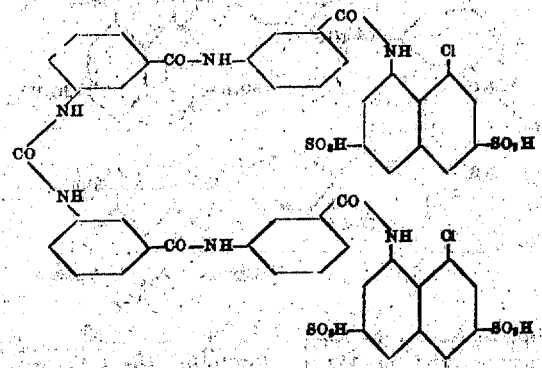

By dissolving in carbonate of soda and salting it out again, it is obtained as a white precipitate. Even very dilute solutions of the acid make trypanosomes disappear from the blood of animals infected with them.

In a like manner ureas with similar properties are obtained if other sulfonic acids such as 8-chloro- or bromo-1-naphthylamin-3.5-disulfonic acid are employed.

Example 10: To 135 parts of the neutral sodium salt of the ureid of meta-aminoanisoyl - meta - amino anisoyl - 1 - amino - 8 - oxynaphthalene-4.6-disulfonic acid in concentrated aqueous solution 25 parts of dimethylsulfate are added. The mixture is still removed until no copulation of an alkaline test portion takes place any more. The new acid is salted out, it has the following formula:

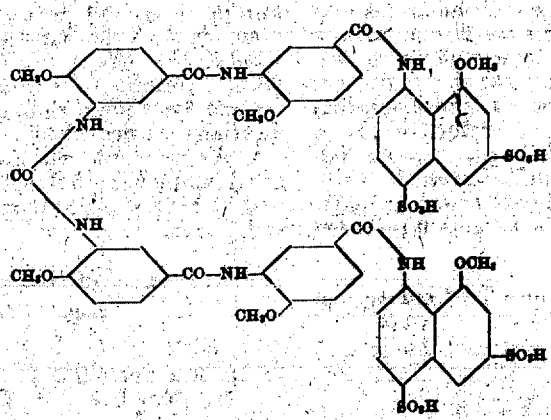

By dissolving in carbonate of soda and salting it out again, it is obtained as a yellowish precipitate.

Example 11: 61 parts of the acid sodium salt obtained by the action of meta-nitrobenzoylchlorid on the reduced substituted derivative obtained from meta-nitrobenzoyl chlorid and 1-amino-8-ethoxynaphthalene-3.6-disulfonic acid and subsequent reduction which possesses the following formula:

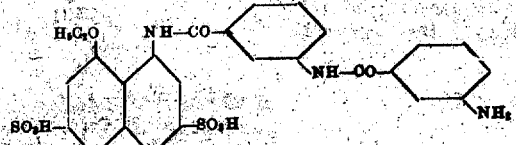

are dissolved in water and carbonate of soda to form the neutral salt. Then 50 parts of calcined sodium carbonate are added and phosgen is introduced. The reaction is finished, if on addition of nitrite of sodium no diazotation takes place any more. The new acid thus obtained has the following formula:

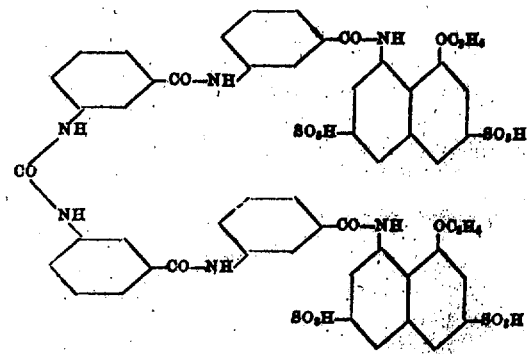

By dissolving the acid in carbonate of soda and salting it out again, it is obtained as a yellowish precipitate.

In a like manner ureas with similar properties are obtained if other sulfonic acids such as 1-amino-8-methoxy-4.6-disulfonic acid are employed; or if instead of the aminoacidyl groups of the examples other acidyl radicals are introduced, such as aminophenyl-acetic-acid-chlorid. The same or different acidyl radicals or aminonaphthalene compounds can be used.

Although we have above described examples by which the ureids and thioureids may be obtained, nevertheless we do not wish to be understood as thereby excluding equivalents for the ingredients, or the operations employed in the process. It is probable that substitutes, for example, various kinds of aminonaphthalene-sulfo-acids, various halids of aromatic acids and of aromatic sulfo acids, etc., may be employed without departing from the scope of the invention intended to be secured hereby.

We claim:—

1. As new products ureids of substituted aminonaphthalene substances characterized by containing in their molecule the general group:

A—NH—R—Y—NH— in which A stands for the radical of a naphthalene compound, R stands for the residue of an acid group, and Y for an aromatic radical, substantially as described.

2. As new products ureids of substituted aminonaphthol substances characterized by containing in their molecule the general group:

in which R stands for the residue of an acid group, n a number less than 7, X for substituting groups, n' a number less than five, and X' for substituting groups, forming salts with metals, and forming azo dyestuffs with diazotized anilin, substantially as described.

3. As new products ureids of substituted aminonaphthol substances characterized by containing in their molecule an aggregation of the general group:

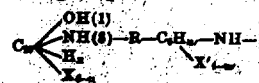

in which R stands for a divalent group containing an acidyl radical, n a number less than seven, X for substituting groups, n' a number less than 5, and X' for substituting groups, forming salts with metals, and forming azo dyestuffs with diazotized anilin, substantially as described.

4. As new products the ureids of substituted aminonaphthol substances characterized by containing in their molecule the general group:

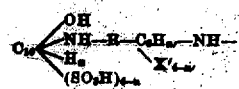

in which R stands for the residue of an acid group, n a number less than 7, n' a number less than five and X' for substituting groups; forming salts with metals and forming azo dyestuffs with diazotized anilin, substantially as described.

5. As new products the ureids of substituted aminonaphthol substances characterized by containing in their molecule an aggregation of the general group:

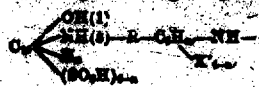

in which R stands for a divalent group containing an acidyl radical, n a number less than seven, n' a number less than 5, and X' for substituting groups; forming salts with metals and forming azo dyestuffs with diazotized anilin, substantially as described.

6. As new products ureids of substituted aminonaphthol substances characterized by containing in their molecule the general group:

$$C_{10}\!\!\begin{array}{l}\mathrm{-OH}\\ \mathrm{-NH-R-C_6H_{4'}-NH-}\\ \mathrm{-H_4}\\ \mathrm{-(SO_3H)_2}\ \ \mathrm{X'_{4-n}}\end{array}$$

in which R stands for the residue of an acid group, n' a number less than five, and X' for substituting groups; forming salts with metals, and forming azo dyestuffs with diazotized anilin, substantially as described.

7. As new products ureids of substituted aminonaphthol substances characterized by containing in their molecule an aggregation of the general group:

$$C_{10}\!\!\begin{array}{l}\mathrm{-OH(1)}\\ \mathrm{-NH(8)-R-C_6H_{4'}-NH-}\\ \mathrm{-H_4}\ \ \ \ \ \ \ \ \ \ \ \ \ \ \ \ \mathrm{X'_{4-n}}\\ \mathrm{-(SO_3H)_2}\end{array}$$

in which R stands for a divalent group containing an acidyl radical, n' a number less than 5, and X' for substituting groups; forming salts with metals, and forming azo dyestuffs with diazotized anilin, substantially as described.

8. As new products ureids of substituted aminonaphthol substances characterized by containing in their molecule the general formula:

$$C_{10}\!\!\begin{array}{l}\mathrm{-OH(8)}\\ \mathrm{-NH(1)-R-C_6H_4-NH-}\\ \mathrm{-H_4}\\ \mathrm{-SO_3H(4)}\\ \mathrm{-SO_3H(6)}\end{array}$$

in which R stands for the residue of an acid group, forming salts with metals, and forming azo dyestuffs with diazotized anilin, substantially as described.

9. As new products ureids of substituted aminonaphthol substances characterized by containing in their molecule the general group:

$$C_{10}\!\!\begin{array}{l}\mathrm{-OH}\\ \mathrm{-NH-CO-C_6H_4-NH-}\\ \mathrm{-H_n}\\ \mathrm{-X_{6-n}}\end{array}$$

in which n stands for a number less than 7, X for substituting groups; forming salts with metals, and forming azo dyestuffs with diazotized anilin, substantially as described.

10. As new products ureids of the substituted aminonaphthol substances characterized by containing in their molecule an aggregation of the general group:

$$C_{10}\!\!\begin{array}{l}\mathrm{-OH(1)}\\ \mathrm{-NH(8)-CO-C_6H_4-NH-}\\ \mathrm{-H_n}\\ \mathrm{-X_{5-n}}\end{array}$$

in which n stands for a number less than seven, X for substituting groups; forming salts with metals, and forming azo dyestuffs with diazotized anilin, substantially as described.

11. As new products ureids of substituted aminonaphthol substances characterized by containing in their molecule the general group:

$$C_{10}\!\!\begin{array}{l}\mathrm{-OH}\\ \mathrm{-NH-CO-C_6H_4-NH-}\\ \mathrm{-H_n}\\ \mathrm{-(SO_3H)_{4-n}}\end{array}$$

in which n stands for a number less than 7; forming salts with metals, and forming azo dyestuffs with diazotized anilin, substantially as described.

12. As new products ureids of substituted aminonaphthol substances characterized by containing in their molecule an aggregation of the general group:

$$C_{10}\!\!\begin{array}{l}\mathrm{-OH(1)}\\ \mathrm{-NH(8)-CO-C_6H_4-NH-}\\ \mathrm{-H_n}\\ \mathrm{-(SO_3H)_{4-n}}\end{array}$$

in which n stands for the number of hydrogen atoms left unsubstituted in the naphthalene nucleus; forming salts with metals, and forming azo dyestuffs with diazotized anilin, substantially as described.

13. As new products ureids of substituted aminonaphthol substances characterized by containing in their molecule the general group:

$$C_{10}\!\!\begin{array}{l}\mathrm{-OH}\\ \mathrm{-NH-CO-C_6H_4-NH-}\\ \mathrm{-H_4}\\ \mathrm{-(SO_3H)_2}\end{array}$$

forming salts with metals, and forming azo dyestuffs with diazotized anilin, substantially as described.

14. As new products ureids of substituted aminonaphthol substances characterized by containing in their molecule an aggregation of the general group:

$$C_{10}\!\!\begin{array}{l}\mathrm{-OH(1)}\\ \mathrm{-NH(8)-CO-C_6H_4-NH-}\\ \mathrm{-H_4}\\ \mathrm{-(SO_3H)_2}\end{array}$$

forming salts with metals, and forming azo dyestuffs with diazotized anilin, substantially as described.

15. As new products ureids of substituted aminonaphthol substances characterized by containing in their molecule the general group:

$$C_{10}\!\!\begin{array}{l}\mathrm{-OH(8)}\\ \mathrm{-NH(1)-CO-C_6H_4-NH-}\\ \mathrm{-H_4}\\ \mathrm{-SO_3H(4)}\\ \mathrm{-SO_3H(6)}\end{array}$$

forming salts with metals, and forming azo dyestuffs with diazotized anilin, substantially as described.

16. As new products ureids of substituted aminonaphthalene substances characterized by the following formula:

$$C\!\!=\!\!Z\begin{array}{l}\mathrm{-NH-Y-R-NH-A}\\ \mathrm{-NH-Y-R-NH-A}\end{array}$$

in which A stands for the radical of a naphthalene compound, R stands for the residue of an acid group, Y stands for an aromatic radical, and Z represents a metalloid; forming salts with metals, substantially as described.

17. As new products ureids of substituted aminonaphthol substances cheracterized by the following general formula:

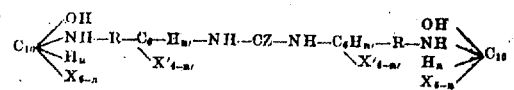

in which R stands for the residue of an acid group, n a number less than 7, X for substituting groups, n' a number less than five, and X' for substituting groups; Z standing for a metalloid; forming salts with metals and forming azo dyestuffs with diazotized anilin, substantially as described.

18. As new products ureids of substituted aminonaphthol substances characterized by the following general formula:

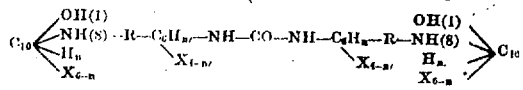

in which R stands for a divalent group containing an acidyl radical, n a number less than seven, X for substituting groups, n' a number less than 5, and X' for substituting groups; forming salts with metals, and forming azo dyestuffs with diazotized anilin, substantially as described.

19. As new products ureids of substituted aminonaphthol substances characterized by the following general formula:

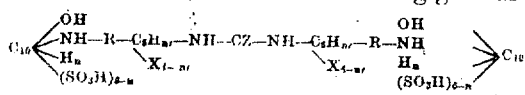

in which R stands for the residue of an acid group, n a number less than 7, n' a number less than five, Z for a metalloid; X for substituents, and forming azo dyestuffs with diazotized anilin, substantially as described.

20. As new products ureids of substituted aminonaphthol substances characterized by the following general formula:

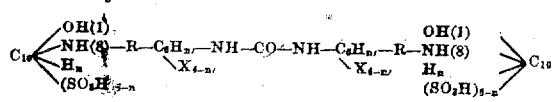

in which R stands for a divalent group containing an acidyl radical, n a number less than 7, X for substituting groups, n' a number less than 5, and X' for substituting groups; forming salts with metals; and forming azo dyestuffs with diazotized anilin, substantially as described.

21. As new products ureids of substituted aminonaphthol substances characterized by the following general formula:

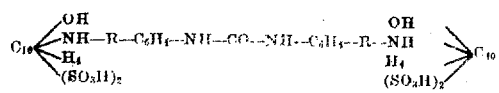

in which R stands for an acid group, forming salts with metals, and forming azo dyestuffs with diazotized anilin, substantially as described.

22. As new products ureids of substituted aminonaphthol substances characterized by the following general formula:

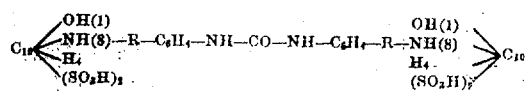

in which R stands for a divalent acidyl radical, forming salts with metals, and forming azo dyestuffs with diazotized anilin, substantially as described.

23. As new products ureids of substituted aminonaphthol substances characterized by the following general formula:

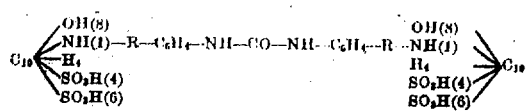

in which R stands for a divalent acidyl radical; forming salts with metals, and forming azo dyestuffs with diazotized anilin, substantially as described.

24. As new products ureids of substituted aminonaphthol substances characterized by the following general formula:

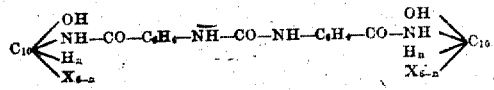

in which n stands for a number less than 7, and X for substituting groups; forming salts with metals, and forming azo dyestuffs with diazotized anilin, substantially as described.

25. As new products ureids of substituted aminonaphthol substances characterized by the following general formula:

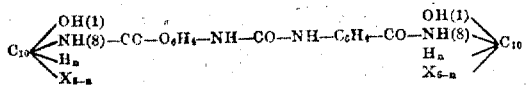

in which n stands for a number less than seven, and X for substituting groups; forming salts with metals, and forming azo dyestuffs with diazotized anilin, substantially as described.

26. As new products ureids of substituted aminonaphthol substances characterized by the following general formula:

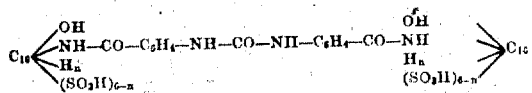

in which n stands for a number less than 7; forming salts with metals and forming azo dyestuffs with diazotized anilin, substantially as described.

27. As new products ureids of substituted aminonaphthol substances characterized by the following general formula:

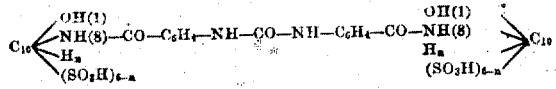

in which n stands for a number less than seven, forming salts with metals, and forming azo dyestuffs with diazotized anilin, substantially as described.

28. As new products ureids of substituted aminonaphthol substances characterized by the following general formula:

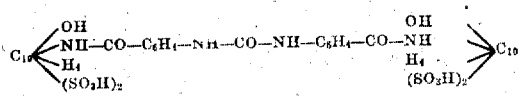

forming salts with metals, and forming azo dyestuffs with diazotized anilin, substantially as described.

29. As new products ureids of substituted aminonaphthol substances characterized by the following general formula:

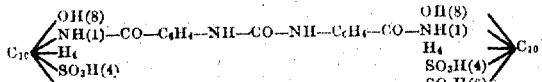

forming salts with metals, and forming azo dyestuffs with diazotized anilin; substantially as described.

In testimony whereof we have hereunto set our hands in the presence of two subscribing witnesses.

BERNHARD HEYMANN.
RICHARD KOTHE.
OSKAR DRESSEL.
ANTON OSSENBECK.

Witnesses:
CHRIS VANDORY,
EDWARD FERTIG.